United States Patent
Street (10) Patent No.: US 8,237,385 B2
(45) Date of Patent: Aug. 7, 2012

(54) SYSTEMS AND METHODS FOR DETECTING POSITION FOR A BRUSHLESS DC MOTOR

(75) Inventor: David Ray Street, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 712 days.

(21) Appl. No.: 12/210,583

(22) Filed: Sep. 15, 2008

(65) Prior Publication Data

US 2010/0066287 A1   Mar. 18, 2010

(51) Int. Cl.
H02P 6/18 (2006.01)
(52) U.S. Cl. ............ 318/400.34; 318/400.06; 318/400.1
(58) Field of Classification Search .......... 318/700, 318/400.03, 400.06, 400.1, 400.11, 400.32, 318/400.34, 400.35, 400.36
See application file for complete search history.

(56) References Cited

U.S. PATENT DOCUMENTS

| | | | |
|---|---|---|---|
| 4,250,435 A * | 2/1981 | Alley et al. ............ 318/400.03 |
| 4,694,210 A * | 9/1987 | Elliott et al. ............ 310/68 R |
| 4,876,491 A | 10/1989 | Squires et al. |
| 5,028,852 A | 7/1991 | Dunfield |
| 5,043,643 A * | 8/1991 | Hedlund et al. ........... 318/254.2 |
| 5,117,165 A | 5/1992 | Cassat et al. |
| 5,202,614 A * | 4/1993 | Peters et al. ............. 318/400.05 |
| 5,254,914 A | 10/1993 | Dunfield et al. |
| 5,317,243 A * | 5/1994 | Cameron ................ 318/400.35 |
| 5,382,889 A * | 1/1995 | Peters et al. ............. 318/400.06 |
| 5,767,643 A * | 6/1998 | Pham et al. ............. 318/400.13 |
| 5,841,252 A | 11/1998 | Dunfield |
| 6,064,175 A * | 5/2000 | Lee ............................... 318/809 |
| 6,249,101 B1 | 6/2001 | Viti |
| 6,337,548 B2 | 1/2002 | Kawabata |
| 6,340,873 B2 | 1/2002 | Seki |
| 6,344,721 B2 | 2/2002 | Seki |
| 6,369,541 B1 | 4/2002 | Albert |
| 6,396,229 B1 | 5/2002 | Sakamoto |
| 6,541,936 B2 | 4/2003 | Viti |
| 6,577,088 B2 | 6/2003 | Heydt et al. |
| 6,841,903 B2 | 1/2005 | Boscolo et al. |
| 2004/0154411 A1 | 8/2004 | Viti |
| 2006/0132070 A1 | 6/2006 | Heydt et al. |

OTHER PUBLICATIONS

"Position Detection of Brushless DC Motor Using Inductance Bridge System," IEEE Transactions on Magnetics, vol. 39, No. 5, Sep. 2003, pp. 1-3 (Park, et al.).

* cited by examiner

*Primary Examiner* — Bentsu Ro
(74) *Attorney, Agent, or Firm* — John J. Patti; Wade J. Brady, III; Frederick J. Telecky, Jr.

(57) ABSTRACT

A system for determining a commutation state for a brushless DC motor includes a controller configured to control current that is applied to drive each of a plurality of phases of the motor. A time delay system is configured to measure, for a given commutation state, a time delay from when a voltage associated with a driven phase of the plurality of phases crosses a predetermined threshold and a voltage associated with a floating phase of the plurality of motor phases crosses the predetermined threshold. Logic is configured to determine the commutation state for the motor based on the measured time delay.

16 Claims, 5 Drawing Sheets

| STATE | ComState [2:0] | MOTOR PHASE HIGH | MOTOR PHASE LOW | MOTOR PHASE FLOAT | TIME DELAY MEASURED |
|---|---|---|---|---|---|
| 0 | 000 | C | B | A | C TO A |
| 1 | 001 | A | B | C | A TO C |
| 2 | 010 | A | C | B | A TO B |
| 3 | 011 | B | C | A | B TO A |
| 4 | 100 | B | A | C | B TO C |
| 5 | 101 | C | A | B | C TO B |
| COAST | 110 | - | - | A,B,C | - |
| COAST | 111 | - | - | A,B,C | - |

If Com St 1 > Com St 3 and Com St 4 > Com St 0 and Com St 5 > Com St 3, use Com State 0.
If Com St 1 > Com St 5 and Com St 2 > Com St 0 and Com St 3 > Com St 5, use Com State 1.
If Com St 0 > Com St 2 and Com St 1 > Com St 5 and Com St 3 > Com St 5, use Com State 2.
If Com St 3 > Com St 1 and Com St 4 > Com St 2 and Com St 5 > Com St 1, use Com State 3.
If Com St 2 > Com St 4 and Com St 3 > Com St 1 and Com St 5 > Com St 1, use Com State 4.
If Com St 0 > Com St 4 and Com St 1 > Com St 3 and Com St 5 > Com St 3, use Com State 5.

SYSTEMS AND METHODS FOR DETECTING POSITION FOR A BRUSHLESS DC MOTOR

TECHNICAL FIELD

The invention relates generally to motor control systems, and more particularly to systems and methods for determining a commutation state for DC motors.

BACKGROUND

In brushless DC motors, commutation states are defined for the mechanical alignments of the phase windings and magnets. These commutation states determine which motor phase is energized. Depending on the position of the motor, the torque applied to the motor can be either in the direction of desired rotation or can be in the opposite direction and many motors, such as a spindle motor on a hard disk drive, can be impaired or damaged if started in the reverse direction. If the rotor position is known before starting the motor, it is possible then to start the motor with no reverse rotation.

Determining the correct commutation state is especially difficult when the motor is at rest, because there is no motion induced back electromotive force ("BEMF") to indicate the present commutation state.

Many detection systems exist that determine the position of the rotor in a brushless DC motor. For example, Hall effect sensing circuitry can be fixed to the motor and provides information about the present position of the rotor relative to an electrical period. The information provided by Hall effect sensing circuitry makes it possible to start the motor in the correct direction. Other motor designs may utilize a rotary encoder to directly measure the rotor's position. Once there is sufficient motion induced BEMF, the BEMF in the undriven windings can be measured to infer the rotor position. Thus, BEMF is useful to control the motor commutation after the motor has reached a sufficient RPM.

SUMMARY

One embodiment of the invention relates to a system for determining a commutation state for a brushless DC motor. The system includes a controller configured to control current that is applied to drive each of a plurality of phases of the motor. A time delay system is configured to measure, for a given commutation state, a time delay from when a voltage associated with a driven phase of the plurality of motor phases crosses a predetermined threshold and a voltage associated with a floating phase of the plurality of motor phases crosses the predetermined threshold. Logic is configured to determine the commutation state for the motor based on the measured time delay.

Another embodiment of the invention relates to a system for determining a commutation state for a brushless DC motor. The system includes a controller configured to control energizing each of a plurality of phases of the motor. A time delay system is configured to provide at least one time measurement corresponding to a time interval from when a driven phase of the plurality of motor phases crosses a predetermined threshold and a floating phase of the plurality of motor phases crosses the predetermined threshold. An activation circuit is configured to connect a load to each phase of the motor for causing a signal indicative of the floating phase of the plurality of motor phases to be provided to the time delay system such that the time delay measurement can be made. Logic is configured to determine the commutation state for the motor based on the at least one time measurement.

Yet another embodiment of the invention relates to a method for determining a commutation state for a brushless DC motor having a plurality of phases and a plurality of commutation states. The method includes applying current to drive a driven phase of the plurality of motor phases and connecting a load to a floating phase to enable measurement thereof. A time delay is measured from when the driven phase of the plurality of motor phases crosses a predetermined threshold and the floating phase of the plurality of motor phases crosses the predetermined threshold. The commutation state is determined based on the measured time delay. The motor can be controlled based on the determined commutation state.

DETAILED DESCRIPTION

Systems and methods for determining a commutation state for a brushless DC motor are described herein. In one embodiment, the system comprises a controller configured to control current that is applied to drive at least one driven phase of a plurality of phases of the motor. When determining the position of a stationary motor, the controller provides a control signal to apply current for a sufficiently short duration such that there is substantially no movement of the motor. A time delay system is configured to make time delay measurements between the driven phase of the plurality of motor phases crossing a predetermined threshold and when a floating phase of the plurality of motor phases crosses the predetermined threshold. The time delay system uses a comparator system configured to compare voltage corresponding to current through at least one driven phase relative to the threshold value and one floating phase relative to the threshold value. Logic is configured to determine a starting commutation state for the motor based on the one or a plurality of time delay measurements for each commutation state.

Once the motor is moving in a present commutation state, a next commutation state is determined by the logic. The logic generates a curve from the time delay measurements of the present commutation state and determines the slope of the curve. A characteristic change in the slope of the curve triggers the logic to indicate to the controller to increment the commutation state machine to a next commutation state. The controller continues to increment commutation states until the motor has a sufficiently high RPM to commutate using the motion induced BEMF of the motor.

Figure 1:
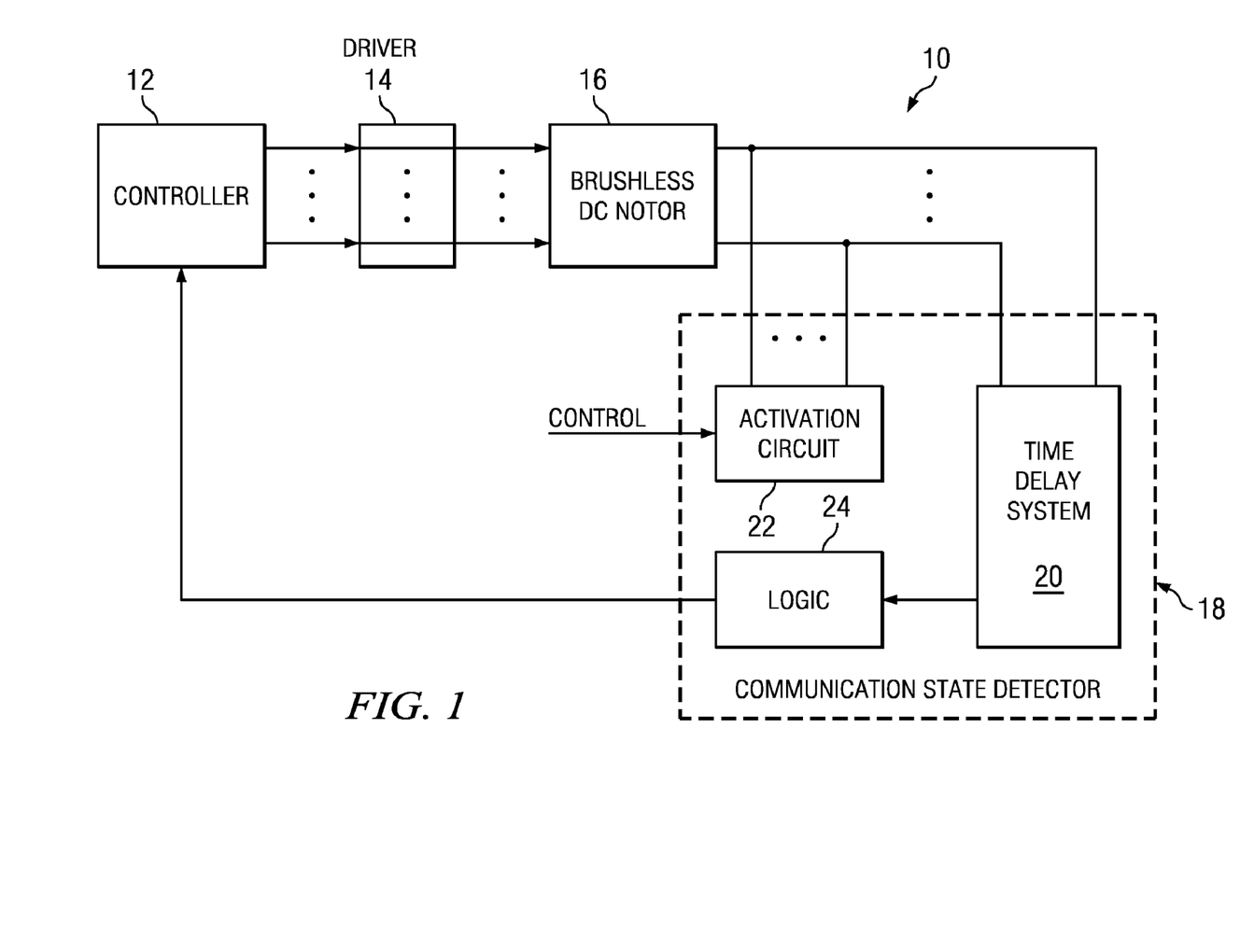
FIG. 1 illustrates a schematic block diagram of a motor system in accordance with an aspect of the invention.

FIG. 1 illustrates a schematic block diagram of a motor system 10 in accordance with an aspect of the invention. The system 10 is configured with circuitry to determine a commutation state of a brushless DC motor 16. The system 10 includes a controller 12 that is configured to control energization of the motor phases, such as by controlling current that is applied to one or more of the windings. A driver 14 is configured to drive at least one of the plurality of windings of the motor 16 based on a control signal from the controller 12.

A commutation state detector 18 is connected to each of the motor phases and is configured to determine a commutation state for the motor. The commutation state detector includes a phase delay circuit 20 that is configured to measure a time delay between a driven phase crossing a predetermined threshold and a floating phase crossing the predetermined threshold. For example, the phase delay circuit 20 can compare the current for the driven phase relative to the threshold and compare the current for a floating phase relative to the threshold. A time difference between when the current for the driven phase crosses the threshold and when the current for the floating phase crosses the threshold defines the time delay. The predetermined threshold value is based on the measured voltages for at least one driven phase and the floating phase of the plurality of motor phases. In one embodiment, the predetermined threshold is a programmable voltage value. The time delay measurements are brief relative to the commutation interval, for example, 1-2 μs, thus, the rotor does not respond with any substantial amount of movement as the windings are energized.

An activation circuit 22 can be configured to cause current to conduct through the floating phase. For example, concurrently with the controller causing current to be applied through the driven phase, the activation circuit 22 can load at least one of the plurality of motor phases with impedance to ground to establish the floating phase in an undriven state. This connection to ground causes current flow through the floating phase, which provides a comparative current for the phase delay circuit 20.

The commutation state detector 18 also includes logic 24 that is configured to determine the commutation state for the motor 16 based on the measured time delay provided by the phase delay circuit 20. Logic 24 can be programmed and/or configured to employ an algorithm that determines the commutation state based on the time delay measurements. The logic 24 provides the commutation state information to the controller 12. This process can be repeated for each of a plurality of possible commutation states during a starting commutation state test phase to determine an appropriate starting commutation state. Since the measurements are short (e.g., less than about 2 μs), the determination of the starting commutation state can be made quickly (e.g., less than about 1 μs).

The commutation state detector 18 can be implemented to control energization of the motor from a stationary condition (or dead stop). Additionally, or alternatively, the commutation state detector 18 can be implemented to continue the motor commutating until it reached a sufficiently high RPM to commutate based on motion induced BEMF. For example, after the motor 16 has begun to move, but has not reached a sufficient speed (RPM) to enable commutation based on BEMF, the commutation state detector 18 can be utilized to control transitions to a next commutation state so as to help maximize the torque of the motor.

As the motor 16 begins to move, the time delay system 20 makes a plurality of time delay measurements at a plurality of positions for the current commutation state. Logic 24 generates a curve from the plurality of time delay measurements and determines a slope. A characteristic change in the slope triggers logic 24 to provide a signal to controller 12 to increment the commutation state to the next commutation state. Logic 24 defines commutation states as odd or even. For example states 0, 2, and 4 are even states. In an even state, logic 24 looks for the characteristic change of an initially positive slope becoming a negative slope. Conversely in an odd state, such as 1, 3 or 5, the characteristic change is an initially negative slope becoming positive. When the characteristic change occurs the logic sends a signal to the controller 12 indicating that the next commutation state should be energized. Once the commutation between states lasts a sufficiently short time, indicating that the motor 16 has reached a sufficient speed, logic 24 may cease to send signals to the controller 12 and the motor 16 may commutate based on BEMF.

Figure 2:
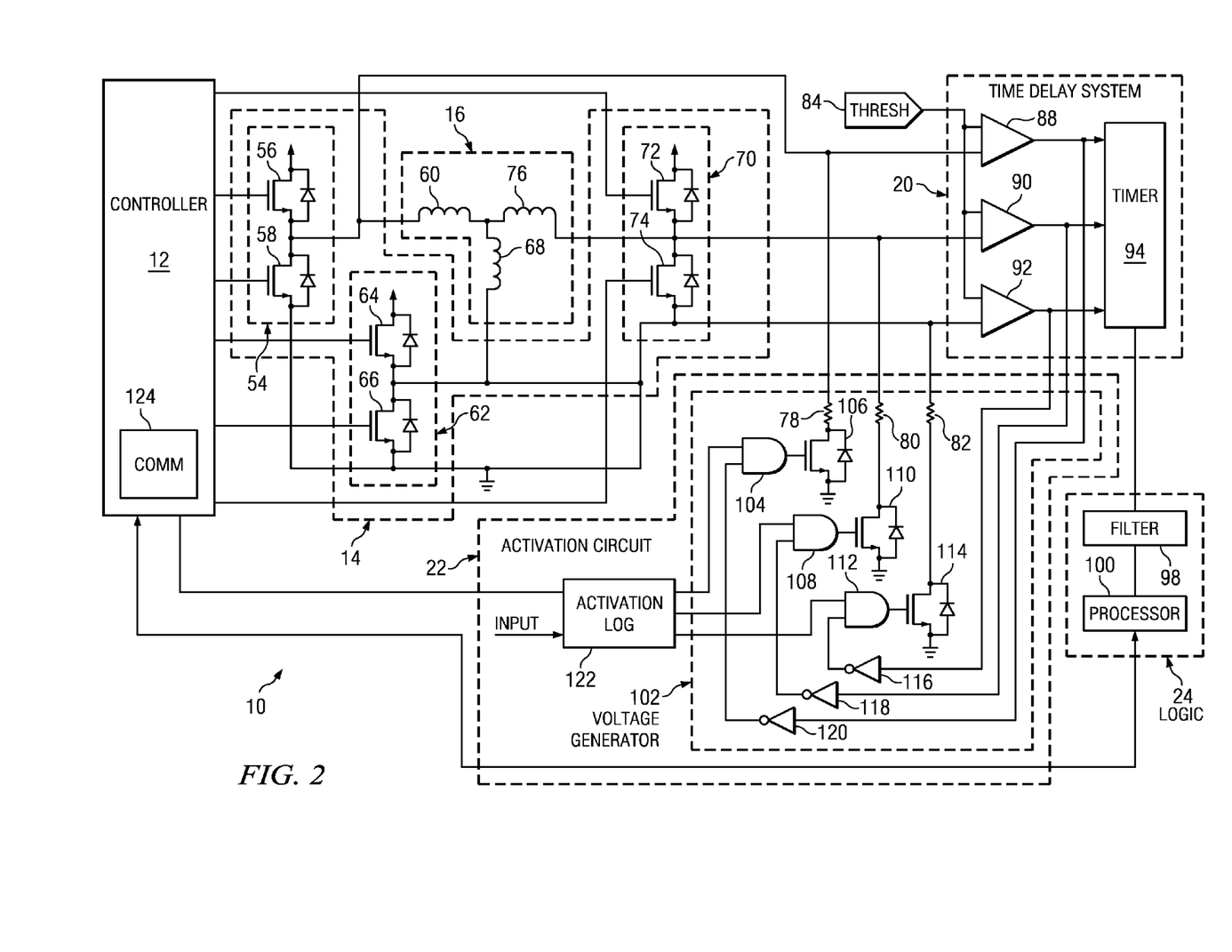
FIG. 2 illustrates a more detailed example of the motor detection system of FIG. 1.

Turning to FIG. 2, a more detailed example of motor system 10 can be seen. In this example, motor 16 is illustrated as a three phase Y-configured motor. One skilled in the art will appreciate that a system described will function for a motor with any number of a plurality of phases or with other types of motor configurations.

Also, in this example, system 10 includes a controller 12 configured to control the current that is applied to drive at least one driven winding of at least one of the motor 16. Collectively, half-bridges 54, 62, and 70 form driver 14 that provides the current to selected phase windings 60, 68 and 76 of motor 16 based on control signals from the controller 12. The controller 12 thus can provide the control signals that vary according to a determined commutation state. The type of control (e.g., the duration and magnitude of the control signals) for activating the driver 14 can also vary depending on the operating mode of the motor system 10, such as can include a start-up mode (e.g., from a substantially stationary position), a ramping mode (e.g., from after the motor begins moving up to some predetermined speed) and a normal mode. In each of the start-up mode and the ramping mode, the controller provides the control signals based on the commutation state, which is determined according to an aspect of the invention.

In the example of FIG. 2, the half-bridges 54, 62, and 70 are each represented as two Metal Oxide Semiconductor Field Effect Transistors (MOSFETs) configured to provide a current to a corresponding winding of the motor 16 based on a control signal from the controller 12. For example, half-bridge 54 includes MOSFETs 56 and 58 connected in series between a control voltage and ground. An intermediate node between the MOSFETs 56 and 58 is coupled to winding 60. Similarly, half-bridge 62 includes MOSFETs 64 and 66 connected to drive winding 68 and half-bridge 70 includes MOSFETs 72 and 74 coupled to drive winding 76. One skilled in the art will appreciate that components other than MOSFETS can be used (e.g. bipolar junction transistor (BJT), relay, etc.).

The controller 12, in this example, also provides control signals to the gates of each MOSFETs to control energization of the respective motor windings 60, 68 and 76, which varies according to the commutation state. Depending on the commutation state, the controller 12 provides control signals to operate each winding in a respective one of driven, sunk, or floating states. For instance, if MOSFET 56 is on and MOSFET 58 is off, half-bridge 54 drives the winding 60 high, with winding 68 (or winding 76) being driven low while the other winding 76 (or winding 68) is floating. Each of the phases can be driven high, low or be floating depending on the commutation state (see, e.g., FIG. 3 described herein).

A time delay system 20 is configured to measure a time delay (or time difference) between the driven phase crossing a predetermined threshold and the floating phase crossing the predetermined threshold. For instance, the time delay system 20 can measure the time delay based on current through the energized (e.g., driven) phase relative to the current through the floating phase for each of the plurality of commutation states. The predetermined threshold can be programmable. For example, the threshold can be provided from a digital-to-analog converter in response to a corresponding digital input (e.g., provided by a processor, memory or other circuitry—not shown).

The time delay system 20 can include comparators 88, 90 and 92, each having an input coupled to a respective phase winding 60, 76 and 68 and another input connected to the predetermined threshold 84. Each comparator 88, 90 and 92 thus can provide a comparator output signal indicating whether the phase voltage (or current) is greater than the threshold. A timer 94 is configured to receive each of the comparator outputs and determine the time delay (or difference) between the driven phase and the floating phase for each commutation state, such as described herein. The timer 94 provides a timer output signal having a value indicative of the measured time delay (between the driven phase and the floating phase crossing the threshold) for a given commutation state. It will be appreciated that for each commutation state, the low-side driven phase will be pulled low (to ground) via a corresponding low-side MOSFET of the driver such that its voltage should not cross the threshold. Accordingly, the comparator outputs only indicate crossing of the predetermined threshold 84 for the high-side driven and floating phases.

In order to create a voltage across the floating phase for use in determining the time delay values, a voltage generator 102 is connected to each phase winding 60, 68 and 76. The voltage generator 102 is configured to provide a corresponding input signal to the non-threshold input of each comparator 88, 90 and 92 for a respective floating phase, which depends on the motor commutation state. Thus, activation control logic 122 is configured to control the voltage generator 102 based on the commutation state (e.g., from the controller 12). Based on such control, the voltage generator 102 causes a voltage input to be provided to a respective one of the comparators corresponding to a voltage for the floating phase 60, 68 or 70.

In the example of FIG. 2, the voltage generator 102 includes resistors connected in series between each phase winding and activation switches 106, 110 and 114. Each of the activation switches (demonstrated as FETs in FIG. 2) 106, 110 and 114 are connected between a respective one of the resistors 78, 80 and 82 and electrical ground. Logic circuitry is connected to control each of the activation switches (where, as shown, there is a logic circuit for each switch 106, 110, and 114). The logic circuitry can be implemented, for example, as AND-gates 104, 108 and 112 driven by a commutation state signal provided from the activation control logic 122 (where the activation logic 122 and voltage generator 102 generally comprise activation circuit 22). Additionally, the resistors 78, 80, and 82 switches 106, 110, 114 and logic circuits can comprise loading circuits. For instance, the activation control logic 122 provides a logic signal having a value (e.g., 0 or 1) indicating if a respective phase is a floating phase for a given commutation state. The output of each comparator 88, 90 and 92 is connected to another input of each respective AND-gate 112, 108 and 104 through an inverter 116, 118 and 120. Each AND-gate 104, 108 and 112 also receives an inverted version of the comparator output signals. As a result, the voltage generator 102 operates a respective one of the switches 106, 110, or 114 to connect a respective resistor 78, 80 or 82 in the path of the floating phase, which changes the time constant of the current path. For example, the time constant is inversely proportional to the resistance (e.g., L/R) of the load resistor being switched into the path. Accordingly, when the activation control logic 122 activates a respective switch, current flows according to the established L/R time constant from a given floating phase 60, 68 or 76 until the floating phase crosses the threshold. The effect of loading the floating phase 60, 68 or 76 with the resistor changes the time constant for the current path of the floating phase by an amount sufficient to enable the time delay system 20 to measure the difference between the active phase and the floating phase. Accordingly, the value of resistors 78, 80 or 82 can be selected to provide a desired time constant according to the inductance of the respective phases 60, 68 and 76. When the voltage for a floating phase crosses the threshold 84, the corresponding comparator output signal (now being a logic high) is inverted via one of the inverters 116, 118, 120 and provided at the input of the AND-gate 112, 108, 104 to cause the respective switch device 114, 110, 106 to shut off and stop drawing current from the floating phase for the current commutation state. This process is repeated for each commutation state to enable the time delay system to measure the time delay (or difference) between the driven and floating phases for each commutation state, such as described herein.

When the motor 16 is stationary, the time delay system 20 can make one or more time delay measurements for each of the commutation states. The sequence of measurements can be the same as the commutation sequence for energizing the motor 16 or the sequence can be different from the motor commutation sequence. Time delay measurements are sufficiently short (e.g., 1-2 μs) such that there is substantially no movement in the motor 16.

As described herein, the timer 94 provides a timer output signal that is indicative of the measured time delay between a high-driven and floating phase for a given commutation state. A digital filter 98 can be provided at the output of the timer to average the timer output value. For example, if multiple time delay measurements are taken for a given commutation state, the time delay measurements can be averaged by filter 98 for a more robust time delay measurement for the given commutation state of the motor 16. This process is repeated for each of the plurality of commutation states during the test phase. A processor 100 or other device (e.g., an arithmetic logic unit, digital signal processor or the like) is connected to receive the timer output signal indicative of the measured time delay. The processor 100 is programmed and/or configured to determine a commutation state based on the time delay measurements. During a starting test phase, the processor 100 may implement an algorithm to determine a starting commutation state for the motor 16. For example, the algorithm can compare the time delay measurements for each of the commutation states to identify a starting commutation state based on which of the commutation states had a smallest time delay measurement. The processor can provide the starting commutation state information to the controller 12, such that a commutation state machine 124 of the controller 12 can be set to an appropriate starting commutation state. The controller 12 thus can provide control signals to the appropriate half-bridges 54, 62 and 70 to begin to energize the motor windings 60, 68 and 76 and thereby begin motor commutation from the stationary position. The processor 100 and filter 98 can also generally comprise logic 24.

As the motor 16 begins moving, the system 10 can also be utilized to control when to transition to a next commutation state based on additional time delay measurements. For example, time delay system 20 can make one or more time delay measurements at different positions in each commutation state. The time delay measurements are provided to the processor 100 that is programmed to identify a characteristic change in the time delay measurements for each current commutation state. To enable the processor to identify the characteristic change, the time delay system 20 can make plurality of measurements for different positions in each of the commutation states, such as measurements made a sufficiently small distance (e.g., about 1-2-physical degrees) apart from each other. Given such time delay measurements, the processor 100 has adequate data to compute a compute the occurrence of a characteristic change in the time delay measurements.

As a further example, the plurality of time delay measurements can correspond to a curve representing each of the time delay measurements. The processor is programmed to differentiate the time delay measurements (e.g., time-averaged measurements) with respect to time and compute the rate of change in the time delay measurements (corresponding to slope of the curve representing time delay measurements). The processor 100 thus is programmed to compute a characteristic change in slope of the curve to send a signal to the controller 12. The detection of a change in slope (e.g., from positive to negative or from negative to positive) indicates that the motor 16 should be commutated to the next commutation state. By commutating to the next commutation state upon detecting the characteristic change in slope, motor torque can be substantially maximized. This process of controlling motor commutation (e.g., for high torque operation) can be continued until a sufficiently high RPM has been reached so that commutation can be controlled based on BEMF, as is known in the art.

Figure 3:
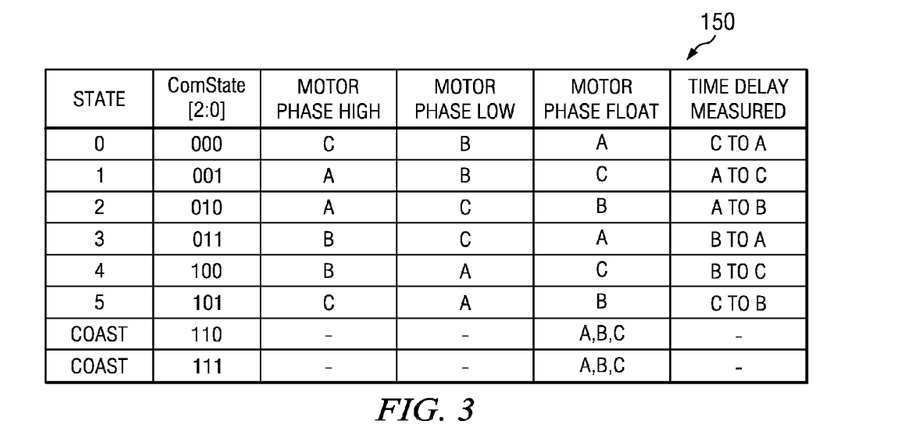
FIG. 3 illustrates a table of commutation states and detection and activation control in accordance with an aspect of the invention.

FIG. 3 illustrates a table 150 of commutation states and detection and activation control that can be utilized in accordance with an aspect of the invention. In the example of FIG. 3, labels A, B, and C are used to designate respective phases of a three phase motor. In the exemplary implementation of a three phase motor, time delay measurements are taken for each of six commutation states, indicated as states 0, 1, 2, 3, 4, and 5. For each commutation state, one phase is driven high, another phase is driven low and a third phase is floating, such as having the relationships for each commutation state shown in each row of FIG. 3. For example, for commutation state zero (0) winding C is energized in a high state and sunk through winding B, which driven in a low state, and winding A is in a floating state. Thus, for commutation state zero, a time delay measurement is made for winding C (in the high driven state) and winding A (in the floating phase), indicated as a time delay measurement form C to A. Similar time delay measurements are taken for each of the commutation states (e.g., from A to C for commutation state 1, from A to B for commutation state 2, from B to A for commutation state 3, from B to C for commutation state 4 and from C to B for commutation state 5), as shown in FIG. 3.

As described herein, the time delay measurements can be made (e.g., by time delay system) by measuring a time delay (or difference) from when a voltage for the high driven phase crosses a predetermined threshold to when a voltage for the floating phase crosses the predetermined threshold. Each measurement can be made one or more times for each commutation state. The manner in which measurements are made and the effect of such measurements in the motor control can vary depending whether the motor is stationary or already commutating. For instance, these measurements are used to either propel the rotor from a stopped position during a start-up phase or to continue to commutate the motor once it has begun rotating. Measurements are not taken while the motor is coasting, as illustrated at the bottom two rows in the table 150. One skilled in the art will appreciate that time delay measurements may be made in an alternative sequence to that illustrated in FIG. 3.

Figure 4:
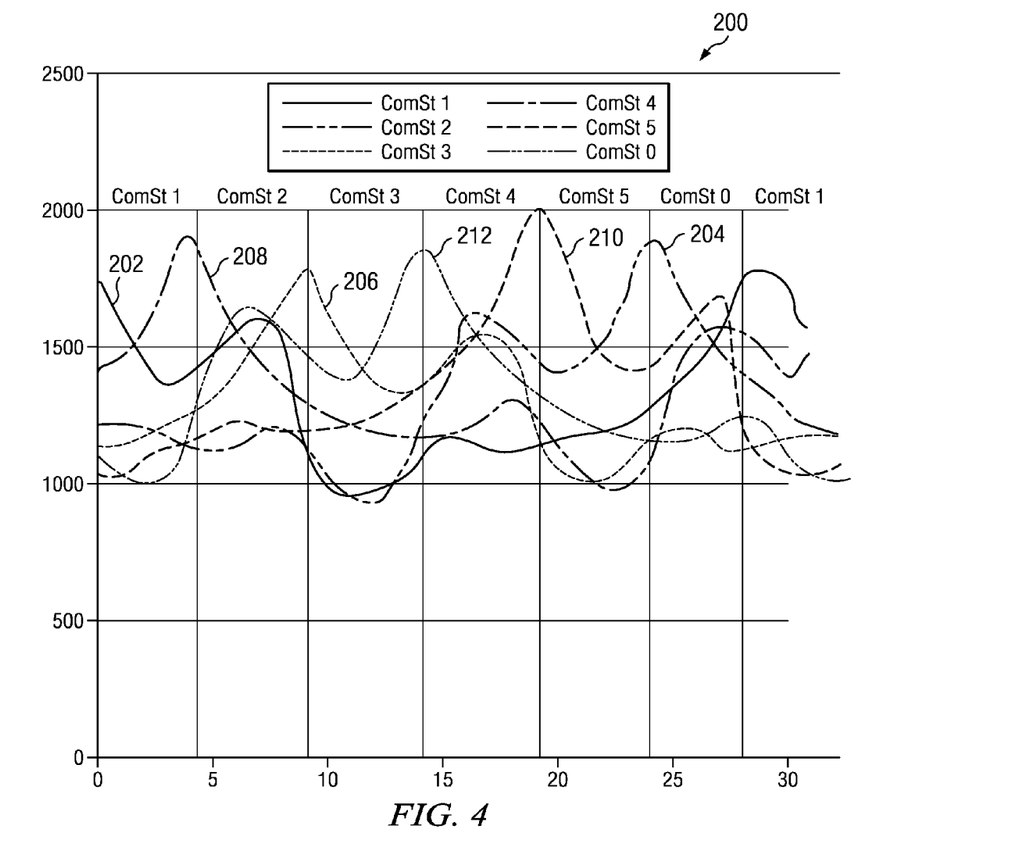
FIG. 4 illustrates a graph of position versus time demonstrating phase delay torque by commutation state in accordance with an aspect of the invention.

FIG. 4 illustrates a graph 200 of time versus position over a plurality of commutation states demonstrating an example of phase delay by commutation state for a three phase motor in accordance with an aspect of the invention. For the example of FIG. 4, time delay measurements were measured on a motor assembly as a function of position for each commutation state. Thus, curve 202 represents phase delay measurements for commutation state 1 as such measurements vary over one electrical revolution of the motor. Similar, curve, 204 represents time delay measurements for commutation state 2, curve 206 represents time delay measurements for commutation state 3, curve 208 represents time delay measurements for commutation state 4, curve 210 represents time delay measurements for commutation state 5, and curve 212 represents time delay measurements for commutation state 0.

Figure 5:
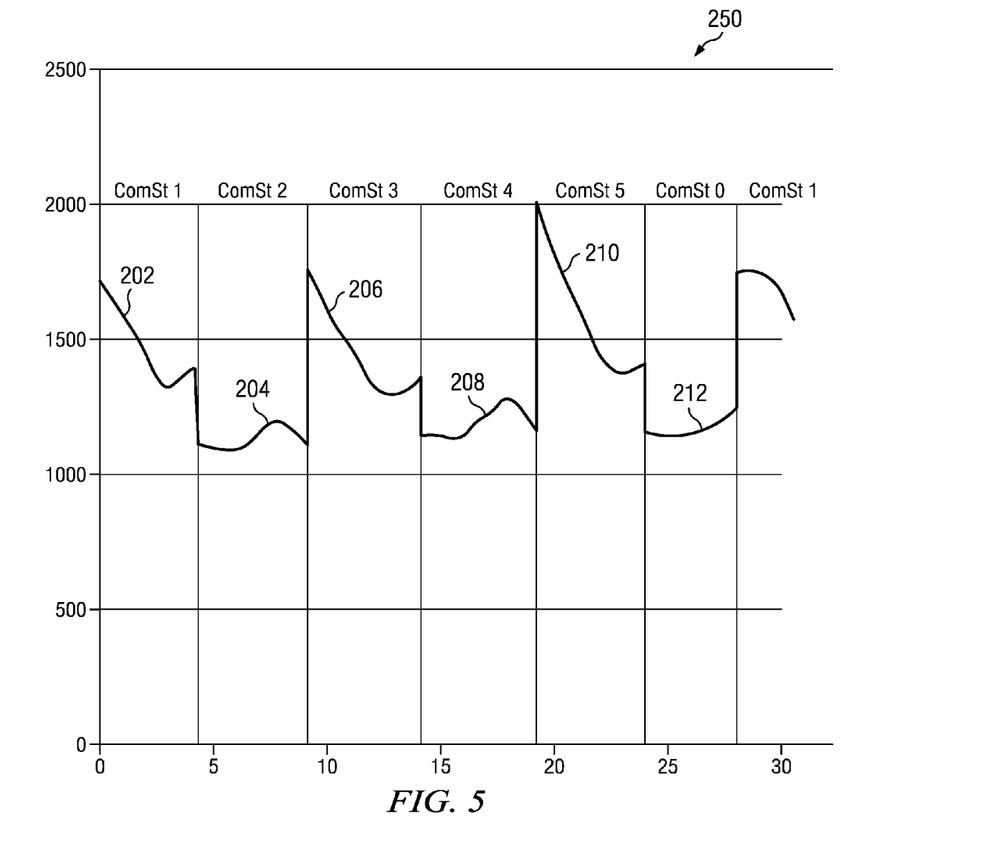
FIG. 5 illustrates a graph of position versus time demonstrating phase delay by commutation state in accordance with an aspect of the invention.

While each time delay curve is shown through each commutation state, it will be appreciated that for the purpose of determining commutation state (e.g., a starting commutation state or a next commutation state), the time delay measurements for a given commutation state (e.g., as demonstrated in FIG. 3) are sufficient. FIG. 5 thus depicts an example graph 250 for the relevant time delay measurements for each commutation state, including portions of curves 202, 204, 206, 208, 210, and 212 from FIG. 4.

These data can be used to develop an algorithm for determining the commutation capable of starting the motor in the desired direction. Each of the commutation states can be considered odd or even states according to the direction that the slope of each curve changes during each commutation state. For example, commutation state 1 is an odd state because it has an initially negative slope as seen in the first commutation state. When the slope becomes positive, the motor assembly should be commutated to a second commutation state in the commutation sequence. It will be appreciated that in practice, there is some delay from detecting the change in slope (e.g., the minima of line 202) until the system advances to the next commutation state 1 because some measurements must be taken after the minima to indicate that the slope has become positive. Additional delay can be caused due to switching delays in the motor driver circuitry, for example.

Once the motor assembly commutates to the second commutation state, curve 204 representing measurements taken in the second commutation becomes relevant for the time delay measurements. The second commutation state can be considered an even state (relative to commutation state 1) because line 204 has an initial positive slope in the second commutation state. The characteristic change occurs for an even state when the initially positive slope becomes negative. Soon after the slope of line 204 becomes negative, the processor can detect the change in slope to trigger the controller to advance to the next (third) commutation state.

Figure 6:
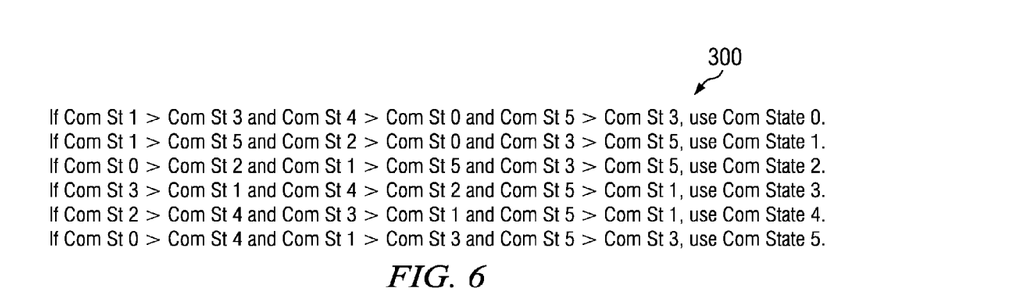
FIG. 6 illustrates an example of an algorithm that can be used for determining a commutation state for a DC motor in accordance with an aspect of the invention.

FIG. 6 illustrates a possible algorithm 300 that can be utilized to determining a starting commutation state capable of starting a brushless DC motor from a substantially stationary position in accordance with an aspect of the invention. FIG. 6 illustrates an algorithm developed from time delay measurements, such as the measurements illustrated in FIG. 4. As shown in FIG. 6, the algorithm 300 determines the starting commutation state for the motor based on relative values of the time delay measurements for at least some of the commutation states. For example, the algorithm 300 includes an algorithm portion that indicates commutation state 0 should be used if the following set of logic conditions are satisfied: if time delay measurement for commutation state 1 is greater than time delay measurement for commutation state 3 AND the time delay measurement for commutation state 4 is greater than the time delay measurement for commutation state 0 AND the time delay measurement of commutation state 5 is greater than the time delay measurement for commutation state 3. As shown, similar conditional logic is established for each possible starting commutations state 1, 2, 3, 4 and 5. One skilled in the art will appreciate that the algorithm can be implemented in hardware (e.g., digital logic, analog circuitry) or software (e.g., instructions running in a processor or ALU) or a combination of hardware and software. It will further be understood that the algorithm and logic conditions for determining a starting (or next commutation state) may further vary depending on the motor configuration.

Figure 7:
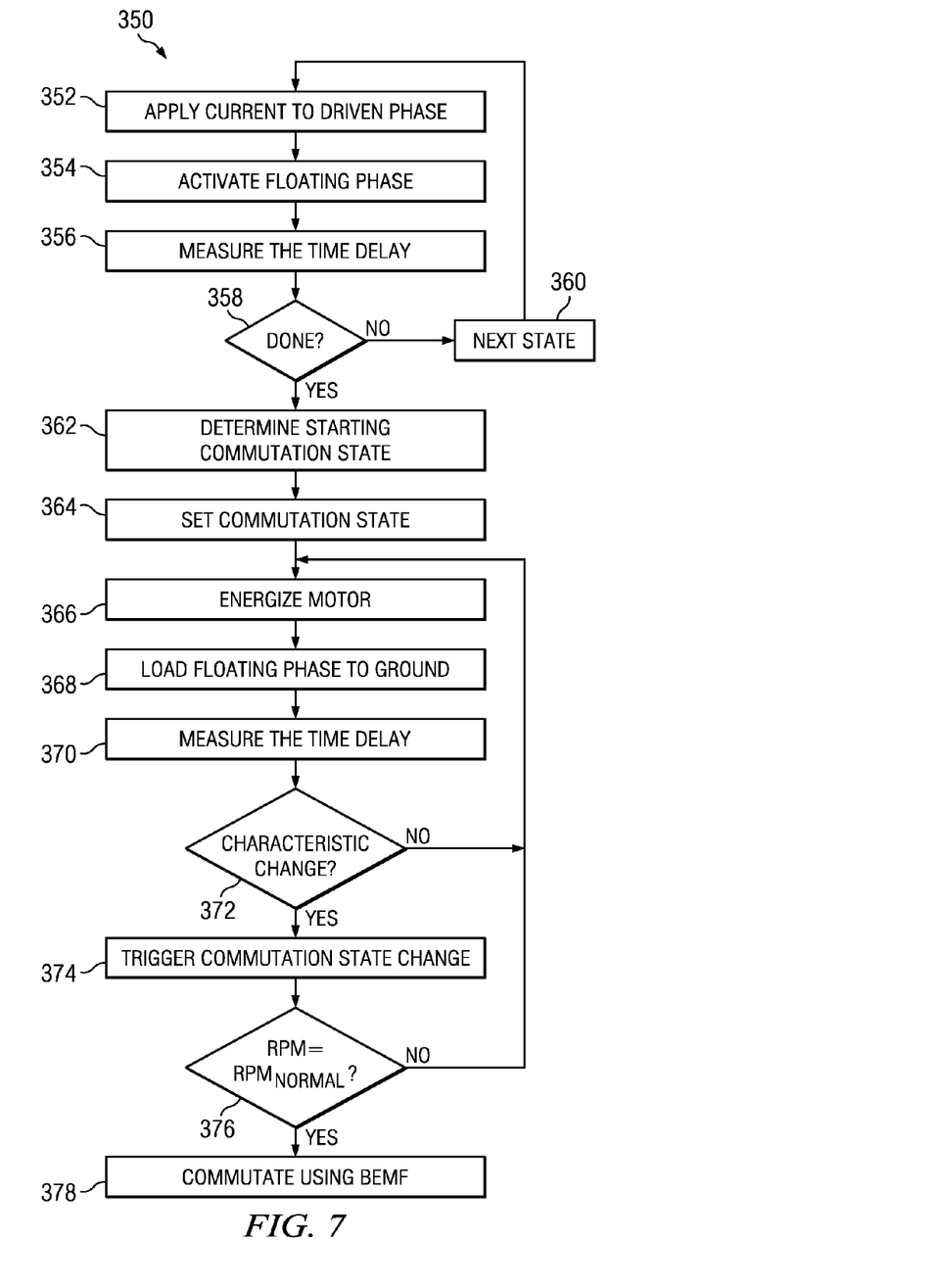
FIG. 7 is a flow diagram of a methodology for commutating a motor in accordance with an aspect of the invention.

FIG. 7 illustrates a methodology 350 for commutating a motor in accordance with an aspect of the invention. The methodology 350 begins in a motor start up phase as it is assumed that the motor is at a substantially stationary or dead stop condition (e.g., not exceeding about 1-2% of its rated speed). In the stationary condition, at 352, a phase of the motor is driven in a high state, such as by applying current from a driver based on a control signal. The phase can be an arbitrary phase in a commutation sequence. At 354, a floating phase is loaded with impedance to ground, which may be concurrent with the activation of the high-side phase. As described herein, FIG. 3 depicts an example of how each phase may be driven (e.g., high, low or floating) for each of a plurality of commutation states for a three phase motor.

At 356, a time delay is measured for the phase that is driven high and the floating phase. The time delay measurement corresponds to an amount of delay from when a voltage (or current) for the driven phase crosses a predetermined threshold and voltage (or current) for the floating phase crosses the predetermined threshold. At 358, it is determined whether phase delay has been measured for each of the commutation states. If not, the methodology 350 proceeds to 360 in which the commutation state is incremented to a next commutation state. From 360, the methodology returns to 350 and blocks 352, 354 and 356 are repeated for the next commutation state. The methodology can loop between 352-358 until a phase delay measurement has been made for each commutation state. Once the time delay measurements have been made for each commutation state, the method proceeds from 358 to 362 where the starting commutation state is determined based on the phase delay measurements. At 364, the determined starting commutation state is set from which a controller can begin commutation of the motor. Thus, blocks 352-364 correspond to a start-up phase (or mode of operation) in which a starting commutation state is determined and set according to an aspect of the invention.

At 366, the motor is energized to drive a phase according to the determined starting commutation state. From the starting commutation state, the motor will commutate in a predefined commutation sequence for the motor. As described herein, the motor commutation can be controlled to provide increased torque by controlling subsequent commutation based on similar time delay measurements. This second mode of operation can be considered a ramp-up or intermediate mode that can be employed until the motor reaches a sufficient RPM to be commutated based on BEMF.

At 368, the floating phase for the determined commutation is loaded through an impedance (e.g., a resistance) to ground while other motor phases are driven high and low according to the current commutation state. At 370, the time delay between the phase driven high and the floating phase is measured. Those skilled in the art will appreciate various types of devices and circuitry that can be utilized to measure the time delay based on the teachings herein. The time delay measurement at 370 can include one or more time delay measurements for the current commutation state indicating a delay or difference from the high driven phase crossing a predetermined threshold and the floating phase crossing the predetermined threshold. At 372, it is determined whether or not there has been a characteristic change (e.g., a change in slope) in the time delay measurements for the current commutation state. As described herein, the change may be from positive to negative or from negative to positive depending on whether the commutation state is odd or even. If there is no characteristic change in the time delay measurements, the motor remains in the same commutation state and the methodology 350 returns to 366 to repeat 366-372. If the characteristic change in the time delay measurements is detected at 372, the methodology proceeds from 372 to 374.

At 374, a commutation state change is triggered. For example, a processor or other device that determines the change in the time delay measurement for the current commutation state can trigger a motor controller to advance to the next commutation state in the commutation sequence. At 376, it is determined whether the motor has reached a sufficient speed to utilize BEMF to commutate the motor. Those skilled in the art will appreciate various types of sensors or other mechanisms that can be used to determine motor speed. If the speed is not sufficient to control motor commutation using BEMF (e.g., corresponding to a normal motor speed, indicated at $RPM_{NORMAL}$, the methodology returns to 366 to continue controlling motor commutation based on time delay measurements, such as by repeating 366-374. If it is determined at 376 that the motor RPM is sufficient to enable control based on BEMF, the methodology proceeds to 378 in which motor may enter a normal operating mode in which the motor is commutated using BEMF. Those skilled in the art will understand and appreciate various approaches that exist (or have yet to be developed) that can be utilized to commutate based on BEMF.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications and variations that fall within the scope of this application including the appended claims.

What is claimed is:

1. A system for determining a commutation state for a brushless DC motor, the system comprising:
  a controller configured to control current that is applied to drive each of a plurality of phases of the motor;
  a time delay system configured to measure, for a given commutation state, a time delay from when a voltage associated with a driven phase of the plurality of phases crosses a predetermined threshold and a voltage associated with a floating phase of the plurality of motor phases crosses the predetermined threshold; and
  logic configured to determine the commutation state for the motor based on the measured time delay, wherein the time delay system provides a plurality of time delay measurements corresponding to the measured time delay for the given commutation state, and wherein, after the motor has begun moving, the logic is programmed to determine a next commutation state in a predefined commutation sequence based on detecting a characteristic change in the plurality of the time delay measurements for a current commutation state.

2. The system of claim 1, wherein the characteristic change in the plurality of the time delay measurements corresponds to a sign change for a slope of a curve representing the time plurality of time delay measurements.

3. The system of claim 2, further comprising a filter configured to average the plurality of time delay measurements to provide an average indication of the measured time delay, the logic employing the average indication of measured time delay over a plurality of measurements to determine the characteristic change in the plurality of time delay measurements.

4. The system of claim 1, further comprising an activation circuit that is configured to connect a load in series with each phase of the motor for causing a voltage associated with the floating phase to be provided to the time delay system such that the time delay can be measured by the time delay system.

5. The system of claim 4, wherein the time delay system further comprises:
a plurality of comparators, each of the plurality of comparators being configured to compare a respective voltage associated with a respective one of the plurality of phases with the predetermined threshold and provide a comparator output signal; and
a timer that provides the measured time delay based on a time difference between the comparator output signal for the driven phase and the comparator output signal for the floating phase for the given commutation state.

6. The system of claim 4, wherein the activation circuit further comprises logic circuitry configured to control a switch device that is activated to couple the floating phase for a current commutation state with ground to provide the voltage associated with the floating phase to the time delay system.

7. The system of claim 1, wherein the system further comprises a filter configured to average the measured time delay to provide an average indication of the measured time delay, the logic determining the commutation state for the motor based on the average indication of measured time delay.

8. A system for determining a commutation state for a brushless DC motor, the system comprising:
a controller configured to control current that is applied to drive each of a plurality of phases of the motor;
a time delay system configured to measure, for a given commutation state, a time delay from when a voltage associated with a driven phase of the plurality of phases crosses a predetermined threshold and a voltage associated with a floating phase of the plurality of motor phases crosses the predetermined threshold; and
logic configured to determine the commutation state for the motor based on the measured time delay, wherein the logic employs an algorithm programmed to determine the commutation state for the motor, and wherein the commutation state defines a starting commutation state for the motor from a substantially stationary position, and wherein the time delay system provides a value indicative of the measured time delay for each of the plurality of commutation states, and wherein the algorithm is programmed to determine the starting commutation state for the motor based on relative values of the measured time delay for at least some of the plurality of commutation states, and wherein after the starting commutation state has been determined to commutate the motor, the logic is programmed to determine a next commutation state in a commutation sequence based on detecting a characteristic change in the measured time delay for a current commutation state.

9. A method for determining a commutation state for a brushless DC motor having a plurality of phases and a plurality of commutation states, the method comprising:
applying current to drive a driven phase of the plurality of phases;
connecting a load to a floating phase to enable measurement thereof the floating phase;
measuring a time delay from when the driven phase of the plurality of phases crosses a predetermined threshold and the floating phase of the plurality of motor phases crosses the predetermined threshold;
determining the commutation state based on the measured time delay; and
controlling the motor based on the determined commutation state, wherein during a start-up mode while the motor is substantially stationary, the method includes the steps of:
measuring the time delay for each of the plurality of commutation states; and
determining the commutation state as a starting commutation state for the motor based on relative values of the time delay for at least some of the plurality of commutation states;
and wherein after the starting commutation state has been determined in the start-up mode, the method the method includes the steps of:
measuring the time delay to provide a plurality of the time delay measurements for a current commutation state of the motor; and
determining a next commutation state for the motor based on detecting a characteristic change in the plurality of the time delay measurements for the current commutation state.

10. An apparatus for driving a brushless DC motor having a rotor, a plurality of commutation states, and a plurality of phases, the apparatus comprising:
a plurality of output terminals, wherein each output terminal is configured to be coupled to at least one of the plurality of phases, wherein, for each communication state, there is at least one undriven phase;
a driver that is coupled the plurality of output terminals;
a controller that is coupled to the driver so as to control the driver;
a time delay circuit that is coupled to each output terminal;
an activation circuit that is coupled to the time delay circuit and the controller; and
commutation state logic that is coupled to the time delay circuit and the controller, wherein the time delay circuit, the activation circuit, and the commutation state logic are operable to measure the inductance of the undriven phase for each commutation state so as to determine the position of the rotor.

11. The apparatus of claim 10, wherein the activation circuit further comprises:
activation logic that is coupled to the controller; and
a voltage generator that is coupled to each output terminal, the activation logic, and the time delay circuit.

12. The apparatus of claim 11, wherein voltage generator further comprises a plurality of loading circuits, wherein each loading circuit is coupled to at least one of the output terminals, and wherein each loading circuit is coupled to the activation logic and the time delay circuit.

13. The apparatus of claim 12, wherein each loading circuit further comprises:
a resistor that is coupled to its output terminal;
a switch that is coupled to the resistor; and a logic circuit that is coupled the activation circuit, the time delay circuit, and the switch, wherein the logic circuit controls the switch.

14. The apparatus of claim 13, wherein the timing delay circuit further comprises:
- a plurality of comparators, wherein each comparator receives a threshold signal, and wherein each comparator is coupled to at least one of the output terminals, and wherein each comparator is coupled to the voltage generator; and
- a timer that is coupled each of the comparators and the commutation state logic.

15. The apparatus of claim 14, wherein the commutation state logic further comprises;
- a filter that is coupled to the timer; and
- a processor that is coupled to the filter and the controller.

16. The apparatus of claim 15, wherein each logic circuit further comprises:
- an inverter that is coupled to the comparator associated with its output terminal; and
- an AND gate that is coupled to the inverter and the activation logic.

* * * * *